Patented Jan. 17, 1939

2,143,868

UNITED STATES PATENT OFFICE 2,143,868

DECALCOMANIA ADHESIVE

Peter D. Dexheimer, Mount Penn, Pa., assignor to The Glidden Company, Cleveland, Ohio, a corporation of Ohio No Drawing. Application May 27, 1935, Serial No. 23,706

3 Claims. (Cl. 134—23.1)

This invention relates to adhesives of the type used for coating decalcomanias, and has particular reference to a new adhesive which will retain its elasticity and color, even after prolonged storage, and which is non-bleeding even when applied over oil-soluble bleeding colors such as para red.

In the manufacture of decalcomania transfers, a sheet of paper, coated in some way so that it will separate from the decalcomania proper upon wetting, is coated with paint and/or lacquer, to form a design, which may be applied by printing or the like. Depending on whether the transfer is to be applied to the inside of glass or other transparent body, or to the outside of a surface, the overcoating, printing and body color are placed in one order, or in reverse. It is desirable to then coat the finished transfer with an adhesive, so that it may be fixed in place without first smearing the surface to be covered with the necessary binder.

Because of the fact that these transfers are made far in advance, and may not be used for several years thereafter, all the materials used must be extremely resistant to changes in aging. Extreme flexibility is likewise required, as in the process of application; this property is valuable to ensure proper results. These factors, together with the fact that the adhesive must be capable of adhesion to paint or lacquer, and to surfaces such as wood, glass, metal, and masonry, places unusual demands on an adhesive. As the adhesive is the last coating applied, and is often placed over bleeding color coats such as para red and the like, it is likewise important that the adhesive have no bleeding effect on these pigments. Proper spreading is, of course, another prime necessity.

Such a catalogue of requirements, of course, limits the available products. Glue, properly plasticized, has been felt by the art to be the preferred product; but the choice and amount of plasticizer, and of solvent, is of extreme importance, if the aging, spreading and non-bleeding properties of the product are to be satisfactory.

I have discovered that if a satisfactory product is to be obtained, a satisfactory glue, preferably a hide glue, should be dissolved in water, together with a small amount of a plasticizer such as glycerol, glycol, glucose, etc., and with a blending solvent which is water soluble, which has a slight solvent action on the film forming materials underneath, and which is somewhat less volatile than water. I prefer to employ glycerol as my plasticizer, for optimum results. For the blending solvent, I prefer to use a glycol or polyglycol mono-ether; and from the point of view of working properties for application by the conventional roll-coating machines of the art, the mono-butyl ether of ethylene glycol is the best of the available solvents.

As an example of my invention, an adhesive can be made up as follows:

| | Pounds |
|---|---|
| Water | 74 |
| Hide glue | 14.8 |
| Glycerol | 1.2 |
| Mono-butyl ether of ethylene glycol | 10.0 |

This adhesive, when applied over either lacquer or paint, has good adhesion thereto, and to surfaces to which the transfer is applied. It works well on the coating machine at temperatures between 100 and 120° F. and has no bleeding effect on oil-soluble colors such as para red. On aging, even after several years, it retains its flexibility and good color.

The percentages of the ingredients in the solvent may be varied, of course, if different viscosities for application are desired, or if the viscosity of the glue itself varies from standard.

I have found that hide glue is superior to most other glues as to color retention and viscosity characteristics; and if good color on aging is desired, no substitution should be made.

The ratio of glycerol to glue should be held within narrow limits, and should not go under 6% nor over 10%. Low percentages give poor flexibility, while higher percentages destroy the adhesiveness of the product. The percentage indicated in the example (8%) is the preferred figure. Other plasticizers, while they may be used, are not as satisfactory due either to decreased adhesiveness, or decreased flexibility, or loss of flexibility on aging.

While other water soluble solvents may be substituted for the monobutyl ether of ethylene glycol, such as other glycol ethers, the lactates, etc., coating properties are ordinarily poorer thereby or the speed of dry is affected, and I prefer to use this solvent for best results, although the other glycol monoethers and water soluble solvents having evaporation rates at least as slow as water are within the scope of my invention. The amount used should be such as to ensure adhesion to the undercoater, without undue softening; and will depend, for any solvent, on its rate of evaporation as compared to water.

I claim:

1. A decalcomania adhesive comprising glue, and 6 to 10% of glycerol based on the glue, dissolved in water containing a minor proportion of mono-butyl ether of ethylene glycol.

2. A decalcomania adhesive comprising approximately 14.8% hide glue, 1.2% glycerol, 10% mono-butyl ether of ethylene glycol, and 74% water.

3. A decalcomania adhesive comprising glue and 6—10% of plasticizer based on the glue, dissolved in water containing a minor proportion of a water soluble volatile solvent which has a softening effect on organic coating compositions and which is less volatile than water, said water soluble solvent being selected from the class consisting of glycol ethers and said plasticizer being glycerine.

PETER D. DEXHEIMER.